United States Patent Office 2,963,407
Patented Dec. 6, 1960

2,963,407
DEHYDRATION OF HYDRAZINE

Richard N. Lewis, North Haven, Conn., assignor to Olin Mathieson Chemical Corporation, a corporation of Virginia No Drawing. Filed Oct. 6, 1953, Ser. No. 384,513

3 Claims. (Cl. 202—42)

This invention relates generally to hydrazine and more particularly to a novel method of preparing hydrazine in a concentrated state.

Hydrazine, as usually prepared in commerce today, is obtained in a dilute aqueous solution. Such commercial procedures generally involve use of the Raschig synthesis; namely, a reaction of sodium hypochlorite on aqueous ammonia, thus:

$$NaOCl + 2NH_3 \rightarrow N_2H_4 + NaCl + H_2O$$

Since hydrazine and water from a constant boiling mixture, at a concentration of about 64% to 70% it is the maximum obtainable concentration from ordinary fractional distillation processes.

Since hydrazine in anhydrous form is very desirable for many commercial purposes other methods than distillation—methods which in general were more time-consuming, more expensive, less efficient, and sometimes dangerous—have been resorted to. For example, hydrazine has been precipitated in the form of its sulfate, $N_2H_4 \cdot H_2SO_4$, and regenerated in anhydrous form by treatment with liquid ammonia. Raschig (Ber. 43, 1927 (1910)) used another method by refluxing hydrazine hydrate with solid sodium hydroxide. Simple distillation of this mixture resulted in a concentrated hydrazine. However, neither of these methods is suitable for continuous operation, and both are subject to losses of hydrazine.

It has been proposed to prepare a more concentrated solution of hydrazine by distillation with benzene, toluene or xylene. Such concentration processes do not result in a concentration beyond the hydrazine hydrate composition. A disclosure of this technique is seen in Hurd and Bennett (J. Am. Chem. Soc. 51, 265 (1929)), who themselves state that their process only effects a limited concentration.

It is, therefore, an object of this invention to provide an improved method for separating hydrazine from water. Another object of this invention is to provide a process for producing substantially anhydrous hydrazine. Still another object of this invention is to provide a novel azeotropic distillation method for removing water from aqueous solutions of hydrazine. Other objects will become apparent to those skilled in the art.

In accordance with this invention the foregoing objects are accomplished by distilling aqueous hydrazine in the presence of polar compounds (compounds of high dielectric constant), which form azeotropes (constant boiling mixtures) with water and which do not react chemically with the hydrazine. More specifically, the aqueous hydrazine is distilled in the presence of certain polar compounds, notably alcohols, whereupon the water is removed in the form of a minimum-boiling azeotrope. The hydrazine is then either in its anhydrous state or else of such concentration that advantage can be taken of the known fact that anhydrous hydrazine will distill over as first fraction when aqueous solutions of hydrazine, having a concentration greater than the hydrazine-water azeotrope composition, are distilled. Since this invention can be practiced in either a batch process or in a continuous process a brief discussion of both types of processes is here outlined.

In the batch distillation process the alcohol is added to the aqueous hydrazine solution and distilled. It is found that the water-alcohol azeotrope is the first material to distill. If the alcohol used is not in excess of that required for distilling of the water, the residue will be found to be a concentrated hydrazine solution. This hydrazine solution will either be of the anhydrous type or will, upon subsequent distillation, yield anhydrous hydrazine as the first fraction. Should alcohol have been used in excess of that required to form the azeotrope with the water and if its boiling point was lower than that of hydrazine the excess will distill as a second fraction. There will then remain either an anhydrous hydrazine residue or else a concentrated residue which upon further distillation will yield anhydrous hydrazine as the first fraction.

In a continuous process, which is ideally suited to the recycling of concentrated hydrazine solution, alcohol is added to the aqueous hydrazine solution and it is fed, preferably, to the middle of a fractionating column. This column is then operated in such manner that all of the alcohol comes off at the top while all of the hydrazine comes off at the bottom. If further concentration of the hydrazine is desired it can be fed to a second column where upon further distillation substantially anhydrous hydrazine comes off at the top. The water-containing hydrazine at the bottom is returned to the first column for further dehydration. The alcohol which distills as an azeotrope with the water may also be recycled after it has been substantially freed of its water content.

In either case, batch or continuous, it has been found that the water which is removed by azeotropic distillation with an alcohol is in most cases free of all but traces of hydrazine. This is here recited to point out the advantages of this invention in that the alcoholic azeotropic agent need only be freed of water if its reuse is desired for a subsequent operation.

The invention is illustrated more fully by the examples which follow:

Example I n-Propyl alcohol (136.2 grams) was added to 81.9 grams of an aqueous solution containing 45.8 grams of hydrazine. The mixture was fractionally distilled with the following results:

| Fraction, ° C. | Weight, gms. | Percent Hydrazine |
|---|---|---|
| 86.8–87.5 | 93.0 | 0.0083 |
| 88.7–95.5 | 51.0 | 1.32 |
| 95.5–96.8 | 8.9 | 3.71 |
| 96.8–113.0 | 29.9 | 38.3 |
| 113.0–116.8 | 25.9 | 99.1 |
| Residue | 4.9 | 72.0 |

The amount of hydrazine left on the column or otherwise lost was 4.2 grams.

Example II

Isopropyl alcohol (80.5 grams) was added to 21.8 grams of an aqueous solution containing 12.2 grams of hydrazine. The mixture was fractionally distilled with the following results:

| Fraction, ° C. | Volume, cc. | Percent Hydrazine |
|---|---|---|
| 79.8–80.9 | 100 | |
| 80.9–103 | 10 | |
| 103–114.0 | 2 | 91.3 |
| Residue | | 74.9 |

Example III

Allyl alcohol (98.4 grams) was added to 52.0 grams of an aqueous solution containing 29.1 grams of hydrazine. Analysis of the fractions obtained gave the following results:

| Fraction, °C. | Weight | Percent Hydrazine |
|---|---|---|
| 87.4–88.5 | 55.9 gms. | 0.0012 |
| 88.5–97.2 | 36.2 gms. | 0.10 |
| 97.2–110.0 | 38 cc. | |
| 110.0–108.8 | 12 cc. | 59.0 |
| Residue | | 86.0 |

Example IV

Sec-butyl alcohol (160.3 grams) was distilled with 157.3 grams of aqueous hydrazine containing 88.2 grams of hydrazine as outlined in Example I. Analysis of the various fractions obtained was as follows:

| Fraction, °C. | Weight, gms. | Percent Hydrazine |
|---|---|---|
| 86.4–86.9 | 85.4 | 0.0152 |
| 86.9–92.5 | 84.9 | 9.41 |
| 92.5–114 | 29.3 | 27.45 |
| 113.0–115 | 9.2 | 96.9 |
| Residue | 86.4 | 74.4 |

The amount of hydrazine lost or left in the column was 6.7 grams.

Example V

The residue of Example IV (86.4 grams containing 74.4% hydrazine) was mixed with 60.6 grams of sec-butyl alcohol and redistilled. The following fractions were obtained:

| Fraction, °C. | Weight, gms. | Percent Hydrazine |
|---|---|---|
| 86.0–93 | 40 | |
| 91.5–98.8 | 23.5 | 3.05 |
| 99.0–100.1 | 8.5 | 31.4 |
| 100.2–112.4 | 4.3 | 91.2 |
| 112.2–114.4 | 22.5 | 100.0 |
| Residue | 43.9 | 76.8 |

The hydrazine remaining in the column was washed out and found to amount to 3.65 grams. The hydrazine loss in the two distillations was only 3.7 grams.

Example VI

Isobutyl alcohol (27.3 grams) was distilled with 35 grams of an aqueous solution containing 21.5 grams of hydrazine. The following fractions were obtained:

| Fraction, °C. | Volume, cc. | Percent Hydrazine |
|---|---|---|
| 88.7–104.5 | 27.5 | |
| 104.5–106.4 | 25.7 | 21 |
| 106.4–106.8 | 6.6 | 45.8 |
| 106.8–112.9 | 7.0 | |
| 112.9–116.7 | 4.4 | 98.5 |
| Residue | | |

Example VII

Isoamyl alcohol (37 cc.) was distilled with 37 cc. of a 55% solution of hydrazine (20.8 grams of hydrazine). The following fractions were obtained:

Fraction, °C.: Volume, cc.
93.5–111.8 _____ 24
111.8–112.0 _____ 20
112.0–125 _____ 41
Residue _____ 5

The 111.8–112.0° C. fraction contained 39% hydrazine and 61% amyl alcohol. It separated into two layers, the compositions of which were analyzed as follows:

Top layer—16.5 cc.—28.9% hydrazine.
Bottom layer—3.5 cc.—80.5% hydrazine.

Example VIII

Cyclohexanol (118.6 grams) was distilled with 44.2 grams of an aqueous solution containing 24.8 grams of hydrazine. The several distillate fractions were analyzed and the results tabulated as follows:

| Fraction, °C. | Weight, gms. | Percent Hydrazine |
|---|---|---|
| 98.7–113.0 | 13.4 | 8.07 |
| 113.0–115.6 | 9.5 | |
| 115.6–114.9 | 15.2 | separated into 2 layers (see below). |
| Residue | | |

The 115.6–114.9° C. fraction contained 2 layers, which were analyzed as follows:

Top layer—1.6 cc.
Bottom layer—13.4 cc.—79.1% hydrazine.

As can be seen from the above examples the azeotropic distillation of this invention results either in an anhydrous hydrazine or else in a hydrazine concentration which upon a further separate or continued distillation will yield an anhydrous hydrazine as the first fraction, advantage being taken of the fact that anhydrous hydrazine will distill over as a first fraction when aqueous hydrazine concentrations greater than the hydrazine-water azeotrope composition are distilled. The objects of this invention are, therefore, accomplished by the use of the procedure hereinbefore disclosed.

For a theoretical discussion of this invention the following is offered as a possible explanation for the success attained by its use.

It is known that many substances, both polar and non-polar, form azeotropes with water. It has been found, however, that polar substances are advantageous in being partly miscible with both water and the hydrazine. Such solvent action is an important part of this invention as it causes the attraction between hydrazine and water molecules to weaken, thereby, facilitating the removal of water by distillation. Among such polar compounds, alcohols have been found to be especially advantageous, probably by reason of their hydroxyl groups which displace water by forming bonds with the hydrazine. The failure of the hydrocarbons used by Hurd and Bennett to produce anhydrous hydrazine as discussed above was probably due to the fact that hydrocarbons are not miscible with either water or hydrazine, and can therefore have very little effect on the mixture.

Compounds which have been found operable in the practice of this invention include any alcohol which forms an azeotrope with water and is not reactive toward hydrazine. Examples of alcohols which may be included in this class are the paraffinic alcohols, ethyl, n-propyl, isopropyl, n-butyl, isobutyl, s-butyl, t-butyl, n-amyl, isoamyl, t-amyl, n-hexyl, etc., and napthenic alcohols such as cyclopentanol and cyclohexanol. Alcohols containing functional groups non-reactive toward hydrazine, such as the ether group, thioether group, amino group, and unsaturated groups, may also be used, examples being 2-methoxyethanol, 2-ethoxyethanol, 2-hydroxyethyl methyl sulfide, dimethylaminoethanol, allyl alcohol, etc.

In corroboration with the explanation offered above it has been found that alcohols most effective in removing water from hydrazine are those of high polarity. These alcohols have in general been found to be those of low molecular weight particularly those having fewer than four carbon atoms because alcohols with less than four carbon atoms form no azeotropes with hydrazine, and are, therefore, easily separated. It is to be understood, however, that higher alcohols may be used if the proportions are chosen so that most or all of the alcohol distills with the water.

While a detailed description of the invention has been provided, it is realized that those skilled in the art may make modifications in and adaptations of the process described without departure from the spirit and scope of this invention.

The invention having thus been described, what is claimed and desired to be secured by Letters Patent is:

1. The process of dehydrating aqueous hydrazine which comprises distilling the mixture with propyl alcohol.

2. The process of dehydrating aqueous hydrazine which comprises distilling the mixture with isobutyl alcohol.

3. The process of producing substantially anhydrous hydrazine which comprises distilling aqueous mixtures of hydrazine with n-propyl alcohol.

References Cited in the file of this patent

UNITED STATES PATENTS

| | | |
|---|---|---|
| 2,537,791 | Schwarcz | Jan. 9, 1951 |
| 2,698,286 | Bircher | Dec. 28, 1954 |

FOREIGN PATENTS

| | | |
|---|---|---|
| 652,855 | Great Britain | May 2, 1951 |

OTHER REFERENCES

The Chemistry of Hydrazine by Audrieth & Ogg, copyright 1951 (pages 42–53 are relied on).